United States Patent
Yaguchi et al.

(10) Patent No.: US 10,801,573 B2
(45) Date of Patent: Oct. 13, 2020

(54) MANUFACTURING METHOD FOR COPPER AND ELEMENTAL FREE NON-ASBESTOS-ORGANIC FRICTION MATERIAL

(71) Applicant: NISSHINBO BRAKE, INC., Tokyo (JP)

(72) Inventors: Mitsuaki Yaguchi, Gunma-ken (JP); Masafumi Honma, Gunma-ken (JP); Yasuki Hattori, Gunma-ken (JP)

( * ) Notice: Subject to any disclaimer, the term of this patent is extended or adjusted under 35 U.S.C. 154(b) by 0 days.

(21) Appl. No.: 16/133,561

(22) Filed: Sep. 17, 2018

(65) Prior Publication Data

US 2019/0128355 A1   May 2, 2019

Related U.S. Application Data

(63) Continuation-in-part of application No. 14/347,614, filed on Mar. 26, 2014, now abandoned.

(51) Int. Cl.
| | |
|---|---|
| *F16D 69/02* | (2006.01) |
| *B29C 43/00* | (2006.01) |
| *F16D 65/08* | (2006.01) |
| *F16D 65/092* | (2006.01) |
| *B29L 31/16* | (2006.01) |

(Continued)

(52) U.S. Cl.
CPC .......... *F16D 69/026* (2013.01); *B29C 43/003* (2013.01); *B29K 2065/00* (2013.01); *B29K 2277/10* (2013.01); *B29K 2509/00* (2013.01); *B29L 2031/16* (2013.01); *F16D 65/08* (2013.01); *F16D 65/092* (2013.01); *F16D 2200/006* (2013.01); *F16D 2200/0086* (2013.01); *F16D 2250/0023* (2013.01)

(58) Field of Classification Search
CPC ....... B29B 7/183; B29B 7/005; F16D 69/026; F16D 69/04; F16D 69/00; C08L 21/00
See application file for complete search history.

(56) References Cited

U.S. PATENT DOCUMENTS

| | | | | |
|---|---|---|---|---|
| 4,373,038 | A * | 2/1983 | Moraw | ................. F16D 69/026 188/251 A |
| 6,908,221 | B2 * | 6/2005 | Proni | .................. B01F 15/0201 366/76.7 |

(Continued)

*Primary Examiner* — Galen H Hauth
(74) *Attorney, Agent, or Firm* — Apex Juris PLLC; Tracy M Heims

(57) ABSTRACT

To provide the manufacturing method for a copper and elemental copper free NAO friction material providing an excellent fade resistance and high mechanical strength. [Means to Resolve] This manufacturing method includes the mixing step of mixing the raw friction material compounds to obtain the raw friction material mixture, the kneading step to apply the raw friction material mixture in the sealed type kneader to knead while maintaining the melting temperature of the thermosetting resin in the kneader or higher but lower than the curing temperature (temperature to start curing) under the predetermined pressure to obtain the kneaded raw friction material, the sizing step of sizing the kneaded raw friction material to obtain the raw friction material granulation article, and the hot press molding step of filling the raw friction material sized particles in the molding die to hot press molded by the press machine.

2 Claims, 2 Drawing Sheets

(51) Int. Cl.
*B29K 277/00* (2006.01)
*B29K 509/00* (2006.01)

(56) References Cited

U.S. PATENT DOCUMENTS

| | | | |
|---|---|---|---|
| 2007/0078214 A1* | 4/2007 | Odajima | C08J 3/226 524/474 |
| 2007/0292703 A1* | 12/2007 | Ikuta | B32B 25/08 428/494 |
| 2012/0070680 A1* | 3/2012 | Unno | F16D 69/026 428/549 |
| 2014/0225310 A1* | 8/2014 | Yaguchi | F16D 69/026 264/319 |

* cited by examiner

MANUFACTURING METHOD FOR COPPER AND ELEMENTAL FREE NON-ASBESTOS-ORGANIC FRICTION MATERIAL

CROSS-REFERENCE TO APPLICATION AND CLAIM OF PRIORITY

This invention is continuation in part application of U.S. patent application Ser. No. 14/347,614, filed Mar. 26, 2014, which is the National Stage International Application No. PCT/JP2012/005559, filed Sep. 3, 2012, also claiming priority based on the Japanese Patent Application No. 2011-208899, filed on Sep. 26, 2011, the disclosure of which are incorporated herein by reference.

FIELD OF INVENTION

This invention relates to a manufacturing method for a friction material used on a disc brake pad and a drum brake shoe for an automobile such as a passenger car and a truck.

BACKGROUND OF INVENTION

A braking device such as a disc brake and a drum brake uses friction members such as a disc brake pad and a drum brake shoe where friction materials are affixed to metal back plates.

Normally, a friction member is manufactured through multiple manufacturing steps. One example of a conventional manufacturing method for a disc brake pad is explained according to FIG. 2.

(1) Mixing Step: Raw friction materials including a fiber base material, a binder such as a thermosetting resin, and a friction modifier, are stirred to evenly spread the same by a mixer such as a Loedige mixer and an Eirich mixer to obtain a raw friction material mixture.

(2) Pre-forming Step: The raw friction material mixture, after measuring, is filled in a pre-forming die to press the raw friction material mixture using a press machine to obtain an unfinished/pre-formed friction material.

(3) Cleaning and Surface Treatment Step: A metal back plate on which the friction material to be affixed is cleaned and surface treated such as rustproofing.

(4) Adhesive Application Step: An adhesive is applied on the cleaned and surface treated back plate at a surface to which the friction material is affixed.

(5) Hot Press Molding Step: The unfinished/pre-formed friction material and the back plate after applying the adhesive are superposed each other to be placed in a hot molding die to be hot-pressed to obtain a molded friction material and the friction material is simultaneously affixed to the back plate using the press machine.

(6) Heat Treatment Step: The molded friction material is heated in a heat chamber to complete curing of a thermosetting resin as a binder involved in the friction material.

(7) Grinding Step: The friction material surface is grinded to form a friction surface using a grinder equipped with a grindstone.

Although there is no illustration in FIG. 2, as necessary, prior to the above-described hot press molding step, (1) a granulating step may be added to granulate the raw friction material mixture, (2) after the hot press molding step, a painting step may be added to paint the molded friction material, (3) a step of baking finish may be added to after the painting, (4) a slit-chamfer forming step may be added to form a slit and/or a chamfer on the friction surface, and (5) a scorching step to scorch the friction surface.

Patent Document 1 (Japanese Provisional Patent Publication No. 2002-53846) discloses the mixing step stirring the raw friction material while dry-heating the same at the temperature to soften the binder in order to reduce an amount of the binder to be used therein.

On the other hand, the friction material may be grouped into (1) a semi-metallic friction material that includes 30 weight percent or more but less than 60 weight percent of the steel fiber relative to the entire amount of friction material composition as a fiber base material, (2) a low steel friction material that includes less than 30 weight percent of the steel fiber relative to the entire amount of the friction material composition as a part of a fiber base material, and (3) NAO (Non-Asbestos-Organic) friction material that does not include a steel group fiber such as a steel fiber and a stainless fiber.

Recently, friction materials that cause less brake noise is on demand, and friction members that uses NAO friction material have been used widely, where the NAO friction material includes a fiber base material that does not have a steel fiber and a steel group fiber but has a fiber base material such as a nonferrous metal fiber, an organic fiber, and an inorganic fiber, a binder such as a thermosetting resin, a friction modifier such as an organic filler, an inorganic filler, an inorganic abrasive, lubricant, and a metal particle.

NAO friction materials often include a copper fiber or copper particle that has a large thermal conductivity among metals in order to improve the fade resistance. A fading phenomenon is caused due to a decomposition gas generated as an organic substance in the friction material is decomposed when the temperature and the load of the friction material become higher; however, the copper with the high thermal conductivity is added in the friction material, and the heat dissipation of the friction material itself increases to restrict the generation of the decomposition gas.

Yet, recently, because of the environmental concern, the friction material that does not include the copper as a heavy metal is on demand, and the trend of actively removing the copper and elemental copper has been widened.

Patent Document 2 (Japanese Provisional Patent Publication No. 2006-194441) discloses the brake element that does not include an element copper but has raw friction materials including at least one of steel fiber, aluminum, zinc, tin, or a combination of any one of the aforementioned metallic materials.

Patent Document 3 (U.S. Patent Publication No. 20100084232A) discloses the friction material for a brake that does not include the copper and titanate substantially but includes 15-24 volume percent of the binder, 3-13 volume percent of the fiber, at least one type of 6 volume percent or less of the lubricant, and at least one type of 9-22 volume percent of the abrasive.

Patent Document 4 (U.S. Patent Publication No. 20100084233A) discloses the friction material for a brake that does not include the copper and asbestos substantially but includes 12-24 volume percent of the binder, 2-10 volume percent of the fiber, at least 5 volume percent or less of the lubricant, at least one type of 15-30 volume percent of the abrasive, and at least one type of 10-24 volume percent of titanate.

Patent Document 5 (Chinese Patent Publication No. 101823856A) discloses the copper free friction material that includes 5-14 weight percent in total of nitrile rubber denatured phenolic resin and nitrile rubber powder as the binder, 20-45 weight percent of at least one type of aramid fiber, carbon fiber, steel fiber, or alumina fiber as a fiber base material, 10-40 weight percent of at least one type of molybdenum disulfide, magnesium oxide, or iron sulfide as the metal compound, and 10-18 weight percent of mixture of graphite and mica as the lubricant, and the mixture of barium sulfate, friction dust, and aluminum power.

However, the solutions of arranging the raw material composition as described in Patent Documents 2-5 do not provide sufficient fade resistance and hardly generate the mechanical strength, thereby tending to cause cracking in the friction material.

PRIOR ARTS

Patent Documents

Patent Document 1: Japanese Provisional Patent Publication No. 2002-53846
Patent Document 2: Japanese Provisional Patent Publication No. 2006-194441
Patent Document 3: U.S. Patent Publication No. 20100084232A
Patent Document 4: U.S. Patent Publication No. 20100084233A
Patent Document 5: Chinese Patent Publication No. 101823856A

SUMMARY OF INVENTION

Problems to be Resolved by Invention

This invention was made in consideration of the above-described circumstances and relates to a manufacturing method for a copper and elemental copper free NAO friction material for a friction member such as for a disc brake pad and a drum brake shoe for an automobile brake device, ultimately providing the manufacturing method for the friction material with both excellent fade resistance and high mechanical strength.

Means to Resolve the Problems

For copper and elemental copper free NAO friction material to improve the fade resistance, the heat dissipation of the friction material that is reduced as removing the copper needs to be improved.

Normally, multiple minute gas cavities are formed inside the friction material, and the gas cavities function as an insulating layer and reduce the heat dissipation of the friction material.

In order to improve the heat dissipation of the friction material, the friction material that has less gas cavity but dense structure needs to be manufactured. Inventors studied this manufacturing method for the friction material, especially focusing on a coordination of the raw friction material mixture prior to the hot press molding step.

Then, the inventors reached this invention as finding that after the mixing step for the raw friction material compound, by adding the heating and press kneading step (kneading step) for minutely kneading the raw friction material mixture while heating and pressing the same and the sizing step for sizing the kneaded raw friction material obtained from the kneading step prior to the hot press molding step of the unfinished/pre-formed material, the friction material with less pores but dense structure can be manufactured.

This invention relates to copper and elemental copper free NAO friction material to provide the manufacturing method for the friction material with excellent fade resistance and high mechanical strength.

(1) This invention includes the manufacturing method for a copper and elemental copper free NAO (Non-Asbestos-Organic) friction material at lease including a fiber base material, a binder consisted of thermosetting resin, and a friction modifier, comprising: a mixing step to mix a raw friction material compound in a mixer to obtain a raw friction material mixture; a kneading step to knead the raw friction material mixture to obtain a kneaded raw friction material so as to set the raw friction material mixture in a sealed type kneader which includes a kneading chamber to store the raw friction material mixture, a compression lid to close the upper portion of the kneading chamber, a pair of rotor set in the kneading chamber and a temperature control system to control the temperature inside of the kneading chamber, and then to knead the raw friction material mixture while heating the kneading chamber to the melting temperature of the thermosetting resin or more but lower than the curing temperature (temperature to start curing), and pressurizing the inside of the kneading chamber; and a hot press molding step to hot-press the kneaded raw friction material in the molding die to conduct the hot press molding to obtain the molded friction material. In the manufacturing method for a copper and elemental copper free NAO friction material, the kneading step is divided into a temperature elevation kneading step, a pressure kneading step, and a decompression kneading step, and the pressure of the compression lid in the temperature elevation step is set to be 0 MPa; the pressure of the compression lid in the pressure kneading step is set to be 0.3 MPa or higher but 1.0 MPa or lower; and the pressure of the compression lid in the decompression kneading step is set to be 0 MPa.

Advantages of Invention

According to the manufacturing method of this invention, the copper and elemental copper free NAO friction material that shows an excellent fade resistance and high mechanical strength can be provided.

DESCRIPTION OF EMBODIMENTS

Figure 1:
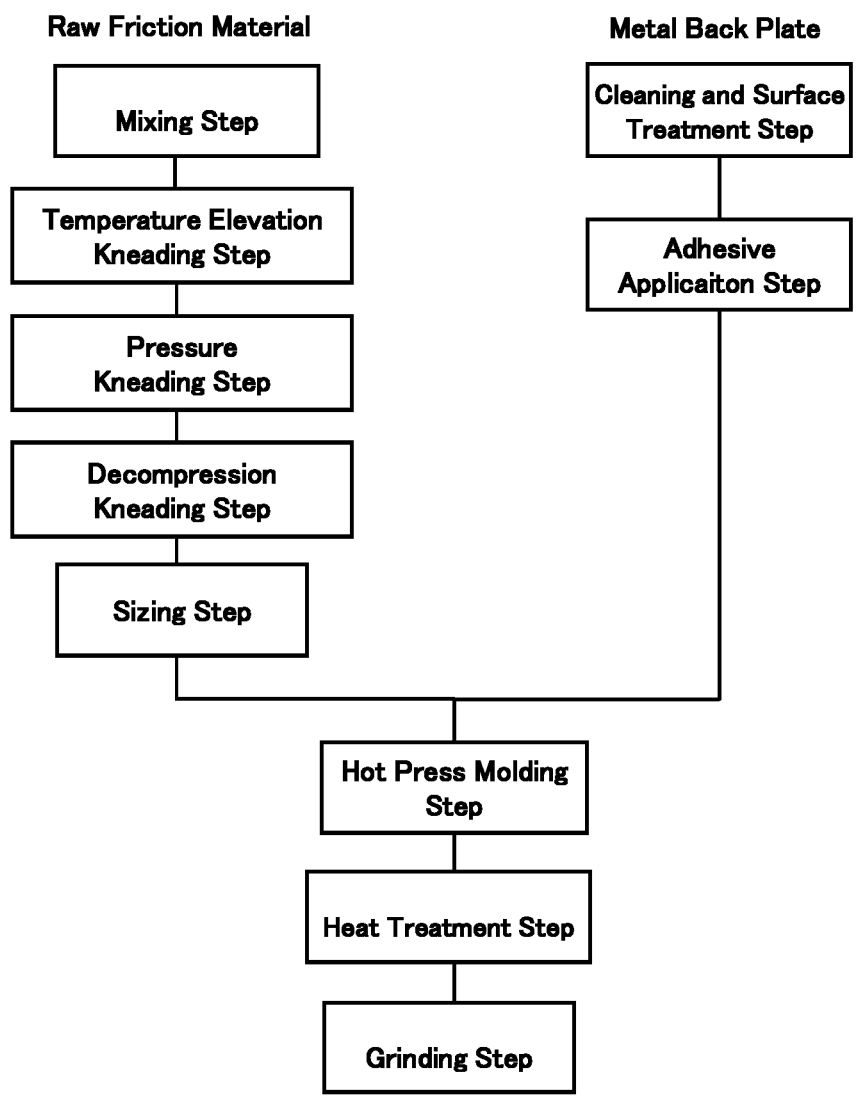
FIG. 1 is a view showing one example of the manufacturing method for the friction material of this invention, showing the manufacturing method for the disc brake pad as a friction member.
Figure 2:
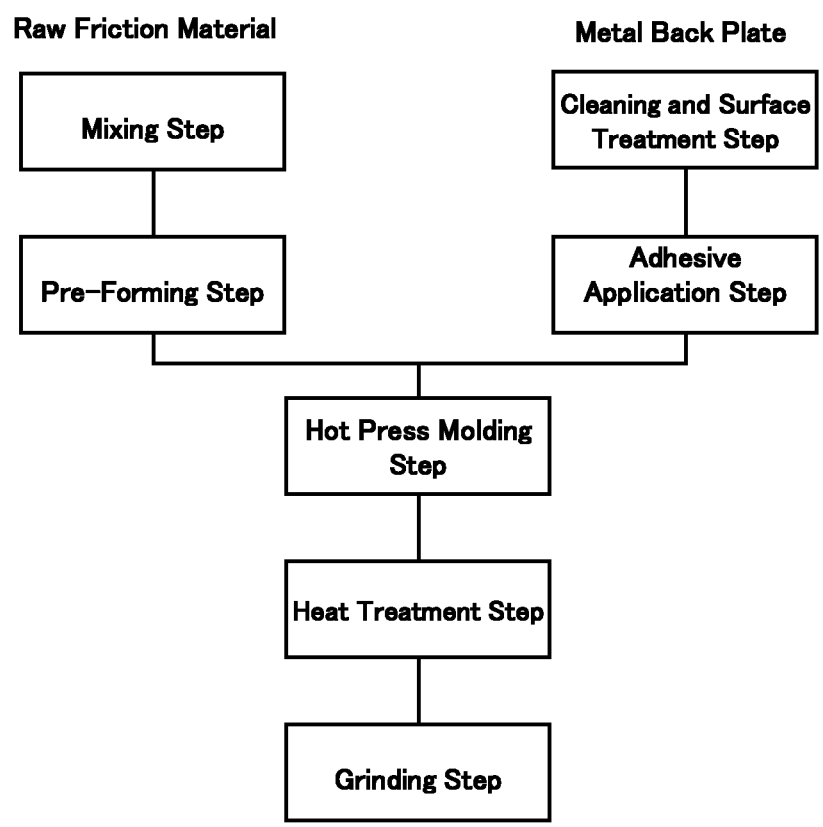
FIG. 2 is a view showing one example of the manufacturing method for the friction material of the conventional art, showing the manufacturing method for the disc brake pad as a friction member.

Embodiments of this invention will be explained in detail below.

[Raw Friction Material]

A raw friction material includes at least a fiber base material, a binder, and a friction modifier The raw friction material will be explained in detail below.

(1) Fiber Base Material

A fiber base material may be a nonferrous metal fiber other than a copper and a copper alloy, an organic fiber such as an aramid fiber and an acryl fiber, and an inorganic fiber such as a carbon fiber, a ceramic fiber, and a rock wool, and one or any combination of the same may be used. So as to secure a sufficient mechanical strength, the content of the fiber base material is preferably 10 weight percent or more but 40 weight percent or lower relative to an entire friction material weight and more preferably 15 weight percent or more but 30 weight percent or lower.

(2) Binder

The binder is made of a thermosetting resin. As the thermosetting resin, one or combination of a phenolic resin, an epoxy resin, a resin modifying the above-described resin with such as cashew oil, silicon oil, or various elastomer, and a resin dispersing the above-described resin with such as various elastomer and fluorine polymer, can be used. So as to secure the sufficient mechanical strength and wear resistance, the content of the binder is preferably 2 weight percent or more but 10 weight percent or lower relative to the entire friction material, and more preferably 4 weight percent or more but 7 weight percent or lower.

(3) Friction Modifier

The friction modifier can be an organic filler such as a cashew dust, a rubber dust (tire tread rubber pulverized powder), a various unvulcanized rubber particle, and a various vulcanized rubber particles, an inorganic filler such as a barium sulfate, a calcium carbonate, a calcium hydroxide, a vermiculite, mica, a silicon carbide, an alumina, a zirconium oxide, a zirconium silicate, a potassium hexatitanate, a magnetite, and a coke a lubricant such as molybdenum disulfide, a tin sulfide, a zinc sulfide, and an iron sulfide, and a nonferrous metal particle other than a copper and a copper alloy, and one or any combination of the above may be used.

In the next section, the manufacturing method for the brake pad as the friction member as one example of the manufacturing method for the friction material according to this invention will be explained with reference to FIG. 1.

<1> Mixing Step

The raw friction material compound of the predetermined compound amount of the above-described raw friction material, for example, is filled in a mixer such as Loedige mixer and Eirich mixer to stir and mix to evenly dispersed. The raw friction material mixture after the mixing step is in powder state.

<2> Kneading Step

The raw friction material mixture obtained through the above mixing step is filled in a sealed type kneader including a kneading chamber, a compression lid to close an upper portion of the kneading chamber, a pair of rotors set in the kneading chamber, and a temperature control system to control the temperature in the kneading chamber and is heated for the inside of the kneading chamber to be at the melting temperature of the thermosetting resin or higher but lower than the curing temperature (temperature to start curing) and at the same time kneaded while pressurizing inside of the kneading chamber. The raw friction material mixture after the kneading step is in paste with appropriate viscosity.

A significant difference between this invention and the conventional arts is the kneading step by kneading and refining the raw friction material mixture already mixed evenly under the predetermined temperature and pressure.

Refining the fiber base material and the friction modifier can provide preferable wear resistance (mechanical strength) to the friction material as well as improves the heat dissipation of the friction material.

The kneading step will be explained below in detail.

<2.1> Kneading Effect

In the kneading step, the thermosetting resin involved in the raw friction material mixture is melted immediately upon heating, and while the thermosetting resin obtained by melting the fiber base material and the friction modifier is kneaded, the fiber base material and the friction modifier are refined by applying the sufficient shearing force to the raw friction material mixture.

<2.2> Kneading Temperature and Pressure

The temperature and the pressure when kneading the raw friction material mixture will be explained next.

In the kneading step, if melting the thermosetting resin takes too much time, the kneading time is extended and the fiber base material and the friction modifier are excessively refined, thereby resulting in the reduction of the strength of the friction material.

Also, if the shearing force applied to the raw friction material is insufficient, refinement of the fiber base material and the friction modifier becomes insufficient, thereby resulting in insufficient fade resistance.

In order to avoid the above-problems, the temperature of the kneading chamber when filling the raw friction material mixture into the sealed type kneader is set 5-10 centigrade lower than the melting temperature of the thermosetting resin.

In addition, in the present invention, the kneading step is divided into a temperature elevation kneading step, a pressure kneading step, and a decompression kneading step, and at the same time, the pressure of the compression lid in the temperature elevation step is set to be 0 MPa; the pressure of the compression lid in the pressure kneading step is set to be 0.3 MPa or higher but 1.0 MPa or lower; and the pressure of the compression lid in the decompression kneading step is set to be 0 MPa. Adding the temperature elevation kneading step at the pressure of the compression lid of 0 MPa in the initial stage of the kneading step, the temperature of the raw friction material mixture, prior to the pressure kneading step of pressurizing the raw friction material mixture, may rise uniformly. Also, adding the decompression kneading step at the pressure of the compression lid of 0 MPa in the latter stage of the kneading step may crush small lump in the raw friction material mixture moderately. As a result, generation of the raw material lump can be suppressed, and the required time for the sizing step in the latter stage can be shorten.

By kneading the raw friction material mixture as satisfying the temperature and pressure conditions, the refinement of the fiber base material and the friction modifier can be realized, and sufficient fade resistance and mechanical strength can be provided to the friction material.

Here, the sealed type kneader that is appropriately used in the kneading step of this invention is such as a "Wonder Kneader" series of Moriyama Company Limited.

<3> Sizing Step

The kneaded raw friction material obtained through the kneading step may leave a raw material lump. This raw material lump may cause problems when measuring the content in the following steps, and therefore the kneaded raw friction material is filled in the mixer such as Loedige mixer and Eirich mixer to stir and mix until the raw material lump disappears. The sizing step may not be a requisite in some cases and can be skipped.

<4> Hot Press Molding Step

The raw friction material sized particles obtained through the sizing step is measured to be filled in a hot molding die and hot press molded by a pressing device for 1-10 minutes at 140-200 centigrade of molding temperature under the molding pressure at 20-80 MPa.

When manufacturing a disc brake pad, the raw friction material sized particles and a steel back plate that is cleaned, surface treated, and applied an adhesive thereon, are superposed to be set in the hot molding die to conduct hot press molding. When manufacturing a brake lining for the drum brake, the raw friction material sizing particle only is filled in the hot molding die to conduct the hot press molding.

<5> Heat Treatment Step

The molded friction material is heated in a heat chamber at 180-250 centigrade for 1-5 hours, and then the curing of the thermosetting resin included in the friction material as the binder is completed.

<6> Grinding Step

A grinder with a grindstone is used to grind the surface of the friction material to form a friction surface.

<7> Other Steps

As necessary, a painting step, a paint baking step, a slit-chamfer forming step, and a scorching step may be performed.

Embodiments

In the following sections, the embodiments of this invention will be explained concretely. However, the scope of this invention is not limited to the embodiments described herein.

First, the manufacturing methods for the disc brake pad in the embodiments 1-6 and the Comparative Example 1-4 will be explained.

(1) Mixing Step

TABLE 1

|  |  |  | Composition 1 | Composition 2 |
|---|---|---|---|---|
| Fiber base Material |  | Aramid fiber | 3 | 3 |
|  |  | Rock wool | 2 | 2 |
| Binder Friction modifier | Inorganic filler | Phenolic resin (melting temperature 90 centigrade) | 6 | 0 |
|  |  | Phenolic resin (melting temperature 100 centigrade) | 0 | 6 |
|  |  | Zirconium oxide | 23 | 23 |
|  |  | Zirconium silicate | 1 | 1 |
|  |  | Potassium hexatitanate | 20 | 20 |
|  |  | Magnetite | 5 | 5 |
|  |  | Mica | 9 | 9 |
|  |  | Vermiculite | 1 | 1 |
|  |  | Barium sulfate | 15 | 15 |
|  |  | Calcium hydroxide | 2 | 2 |
|  |  | Coke | 3 | 3 |
|  | Organic filler | Cashew dust | 5 | 5 |
|  |  | Rubber dust | 1 | 1 |
|  | Lubricant | Artificial graphite | 3 | 3 |
|  |  | Zinc sulfide | 1 | 1 |

Weight %

Components of the raw friction material compounds shown in Table 1 are applied to be stirred for 5 minutes to obtain the raw friction material mixtures.

(2) Kneading Step—Sizing Steps

TABLE 2

| Friction material composition |  |  | E1 C1 | E2 C1 | E3 C1 | E4 C2 | E5 C2 | E6 C2 | CE1 C1 | CE2 C1 | CE3 C1 | CE4 C2 | CE5 C1 |
|---|---|---|---|---|---|---|---|---|---|---|---|---|---|
| Kneading Step | Kneader Chamber Temperature (centigrade) | Adding raw friction material mixture | 85 | 85 | 85 | 90 | 90 | 90 | 85 | 85 | 85 | 90 | No kneading step |
|  |  | Starting pressure kneading step | 110 | 110 | 110 | 110 | 110 | 110 | 110 | 110 | 110 | 110 |  |
|  |  | Ending decompression kneading step | 125 | 125 | 125 | 125 | 125 | 125 | 125 | 125 | 125 | 125 |  |
|  | Temperature Elevation Kneading Step | Pressure (Mpa) | 0 | 0 | 0 | 0 | 0 | 0 | 0 | 0 | — | — |  |
|  |  | Kneading time (minute) | 0.5 | 0.5 | 0.5 | 1.0 | 1.0 | 1.0 | 0.5 | 0.5 | — | — |  |
|  | Pressure Kneading Step | Pressure of compression (Mpa) | 0.3 | 0.5 | 1.0 | 0.3 | 0.5 | 1.0 | 0.1 | 2.0 | 0.5 | 0.5 |  |
|  |  | Kneading time (minute) | 2.5 | 2.5 | 2.5 | 2.5 | 2.5 | 2.5 | 2.5 | 2.5 | 2.5 | 2.5 |  |
|  | Decompression Kneading Step | Pressure of compression (Mpa) | 0 | 0 | 0 | 0 | 0 | 0 | 0 | 0 | — | — |  |
|  |  | Kneading time (minute) | 0.5 | 0.5 | 0.5 | 0.5 | 0.5 | 0.5 | 0.5 | 0.5 | — | — |  |

TABLE 2-continued

| Friction material composition | | E1 C1 | E2 C1 | E3 C1 | E4 C2 | E5 C2 | E6 C2 | CE1 C1 | CE2 C1 | CE3 C1 | CE4 C2 | CE5 C1 |
|---|---|---|---|---|---|---|---|---|---|---|---|---|
| Evaluation Result | Condition of kneaded raw friction material | GD | GD | GD | GD | GD | GD | BD | GD | BD | BD | N/A |
| | Fading effect | GD | EX | GD | GD | EX | GD | N/A | BD | N/A | N/A | BD |
| | Wear resistance | GD | EX | GD | GD | EX | GD | N/A | AV | N/A | N/A | BD |

E = Embodiment
CE = Comparative Example
C = Composition
EX = Excellent
GD = Good
BD = Bad
Av = Average

TABLE 3

| | | Condition of Kneading Raw Friction Material |
|---|---|---|
| Evaluation Method | | Manually checking the condition of kneaded Raw Friction Material |
| Evaluation Standard | GD | no roughness of kneading and no material lump |
| | BD | roughness of kneading and material lump |
| | N/A | no evaluation (no kneading step) |

The raw friction material mixtures are stirred by the Wonder Kneader (WDS7-30, kneading capacity: 7l) of Moriyama Company Limited according to the conditions in Table 2 to obtain the kneaded raw friction material. The condition of the obtained kneaded raw friction material was checked. The evaluation standard is shown in the Table 3, and the evaluation result is shown in the Table 2.

The kneaded raw friction material shown in the Embodiments 1-6 and the Comparative Example 2, where the condition of the kneaded raw friction material is fine, are filled in the Loedige mixer and stirred for 5 minutes to obtain the raw friction material sized particles in the Embodiments 1-6 and the Comparative Example 2.

(3) Hot Press Molding Step

The raw friction material sized particles in the Embodiments 1-6 and the Comparative Example 2 are superposed on the steel back plate that is cleaned, surface treated, and applied an adhesive thereon to be set in the hot molding die to conduct the hot press molding for 5 minutes at the molding temperature of 160 centigrade under the molding pressure at 30 MPa to obtain the molded friction material.

(4) Heat Treatment Step—Finishing Step

The molded friction material is set in the heat chamber and cured for 3 hours at 200 centigrade to be painted, baked, and grinded to make the disc brake pad in the Embodiments 1-6 and the Comparative Example 2.

Next, the manufacturing method for the brake pad in the comparative example 5 will be explained.

(1) Mixing Step

The compositions of the raw friction material compound as in the Table 1 are added in the Loedige mixer and are stirred for 5 minutes to obtain the raw friction material mixture.

(2) Pre-Forming Step

The raw friction material mixture is filled in the pre-forming die and is pressure-molded for 15 seconds under the molding pressure of 30 MPa to obtain the unfinished/pre-formed friction material.

(3) Hot Press Molding Step

The unfinished/pre-formed friction material is superposed on the steel back plate that is cleaned, surface treated, and adhesive applied thereon to be set in the hot molding die to conduct the hot press molding for 5 minutes at the molding temperature of 160 centigrade under the molding pressure at 30 MPa to obtain the molded friction material.

(4) Heat Treatment Step—Finishing Step

The molded friction material is set in the heat chamber and cured for 3 hours at 200 centigrade to be painted, baked, and grinded to make the disc brake pad in the Comparative Example 5.

(5) Performance Comparison

Relating to the disc brake pad manufactured through the above-described steps in the Embodiments 1-6 and the disc brake pad of Comparative Example 2 and 5, the fade resistance and wear resistance (mechanical strength) are evaluated.

(5.1) Evaluation Method

TABLE 4

| | | Fade resistance | Wear resistance |
|---|---|---|---|
| Evaluation Method | | JASO C406 Dynamometer Test First fade minimum μ | JASO C427 Temp.specific wear test Initial-brake temp.: 200 C. No. of applications: 1000 times |
| Evaluation Criterion | EX | 0.25 or more | Less than 0.10 mm |
| | GD | 0.22 or more less than 0.25 | 0.10 mm or more Less than 0.15 mm |
| | AV | 0.19 or more Less than 0.22 | 0.15 mm or more Less than 0.20 mm |
| | BD | Less than 0.19 | 0.20 mm or more |
| | N/A | No evaluation (kneading condition: BD) | No evaluation (kneading condition: BD) |

Relating to the disc brake pad of the Embodiments 1-6 and the Comparative Example 2 and 5, the fade resistance and the wear resistance (mechanical strength) are evaluated. The evaluation method and standard are shown in the Table 4.

(5.2) Evaluation Result

The evaluation result of the fade resistance of every friction material and the wear resistance (mechanical strength) are shown in Table 2.

As apparent from the evaluation result in the Table 2, the friction material manufactured through the manufacturing method of this invention has excellent fade resistance and wear resistance (high mechanical strength).

What we claim is:

1. A manufacturing method for a copper and elemental copper free NAO (Non-Asbestos-Organic) friction material at lease including a fiber base material, a binder consisted of thermosetting resin, and a friction modifier, comprising:
   (1) a mixing step to mix a raw friction material compound in a mixer to obtain a raw friction material mixture;
   (2) a kneading step to knead the raw friction material mixture to obtain a kneaded raw friction material so as to set the raw friction material mixture in a sealed type kneader which includes a kneading chamber to store the raw friction material mixture, a compression lid to close the upper portion of the kneading chamber, a pair of rotor set in the kneading chamber and a temperature control system to control the temperature inside of the kneading chamber, and then to knead the raw friction material mixture while heating the kneading chamber to the melting temperature of the thermosetting resin or more but lower than the curing temperature (temperature to start curing), and pressurizing the inside of the kneading chamber; and
   (3) a hot press molding step to hot-press the kneaded raw friction material in a molding die to conduct the hot press molding to obtain the molded friction material, wherein
   a temperature of the kneading chamber when filing the raw friction material mixture into the sealed type kneader is elevated to 5-10 centigrade lower than the melting temperature of the thermosetting resin,
   the kneading step is divided into a temperature elevating kneading step in which the temperature of the kneading chamber elevates and exceeds the melting temperature of the thermosetting resin, a temperature elevating pressurizing kneading step in which the temperature of the kneading chamber elevates while pressurization takes place, and a temperature elevating decompressing kneading step in which the temperature of the kneading chamber elevates while decompression takes place, and
   a pressure of the compression lid in the temperature elevating step is set to be 0 MPa; a pressure of the compression lid in the temperature elevating pressurizing kneading step is set to be 0.3 MPa or higher but 1.0 MPa or lower; and a pressure of the compression lid in the temperature elevating decompressing kneading step is set to be 0 MPa.

2. The manufacturing method for the friction material according to claim 1, further comprising
   a sizing step between the kneading step and the hot press molding step to sizing the kneaded raw friction material to obtain the raw friction material sized particles.

* * * * *